United States Patent [19]

Bell

[11] Patent Number: 4,669,070
[45] Date of Patent: May 26, 1987

[54] SIGNAL FORMAT FOR OPTICAL TAPE RECORD/PLAYBACK SYSTEM

[75] Inventor: Alan E. Bell, East Windsor, N.J.

[73] Assignee: RCA Corporation, Princeton, N.J.

[21] Appl. No.: 76,753

[22] Filed: Sep. 18, 1979

[51] Int. Cl.$^4$ .......................... G11B 7/00; G01D 9/42
[52] U.S. Cl. ...................................... 369/44; 346/76 L; 346/108; 346/109; 369/45; 369/47; 369/110; 369/111
[58] Field of Search ................... 358/6, 7, 8, 130, 302, 358/347; 346/76 L, 108, 109; 369/44, 45, 111, 47, 110

[56] References Cited

U.S. PATENT DOCUMENTS

| | | | |
|---|---|---|---|
| 3,314,074 | 4/1967 | Becker | 346/108 |
| 3,314,075 | 4/1967 | Becker et al. | 346/108 |
| 3,474,457 | 10/1969 | Becker | 346/76 L |
| 3,654,624 | 4/1972 | Becker et al. | 346/76 L |
| 3,656,175 | 4/1972 | Carlson et al. | 346/108 |
| 3,806,643 | 4/1974 | Russell | 358/302 |
| 4,030,122 | 6/1977 | Chemelli et al. | 358/127 |

Primary Examiner—Stephen C. Buczinski
Attorney, Agent, or Firm—Joseph S. Tripoli

[57] ABSTRACT

An optical tape record/playback apparatus is provided for recording/reproducing information signals onto an optical tape. The record apparatus comprises laser sources which are modulated in accordance with the information signals. A sequence number is recorded by the laser sources to aid in the recovery of information. In the playback mode a light detector is arranged to intercept the light reflected from the optical tape. The reflected light contains the information which was recorded on the optical tape during the recording operations. The high packing density of the information recorded in the tape may affect the proper recovery of the recorded information. During the recording operation a sequence number is recorded in a special section of the optical tape to aid in the recovery of the recorded information signals.

6 Claims, 11 Drawing Figures

SIGNAL FORMAT FOR OPTICAL TAPE RECORD/PLAYBACK SYSTEM

The Government has rights in this invention pursuant to Contract No. 78F-111120 awarded by the U.S. Government.

The present invention relates generally to optical record and playback systems and particularly to optical tape record and playback systems for recording and reproducing video information signals.

Prior art information storage and retrieval systems utilize magnetic, photographic and electron beam techniques to record information signals on various media such as tape, disc and drum surfaces. In magnetic systems the packing density is limited by parameters such as the recording device utilized and the recording speed, and the life of the recording medium is affected by the mechanical connection between the recording medium and the recording head. In photographic systems, the processing step between recording and reproducing does not permit instantaneous reproduction of the recorded information. Although electron beam recording techniques provide reasonably high information packing density, without headwear problems, electron beam recording must be performed within a vacuum chamber. That places severe environmental limitations on the recording system.

In accordance with the principles of the present invention, an optical tape record and playback apparatus, which avoids some of the aforementioned problems and disadvantages of prior art magnetic, photographic and electron beam record and playback apparatus, is provided.

Further, in accordance with the principles of the present invention an apparatus for recording information signals onto an optical tape record medium is provided. The apparatus comprises first and second sources of radiant energy providing beams of coherent light which are modulated in accordance with the information signals. The apparatus further comprises means for guiding the optical tape record medium in an arc greater than 180° adjacent to a rotatable support. First and second means for focusing the coherent light beams to first and second spots on the optical tape record medium are attached to the rotatable support. To effect a helical scan of the optical tape record medium along the arc established by the guiding means by the focused light spots of the coherent light beams, means are provided for establishing relative motion between the rotatable support and the optical tape record medium. The light beam from said first source is directed to the first focusing means during a first time interval and the light beam from the second source is directed to the second focusing means during a second time interval. Further, the apparatus includes means for switching the information signals between a first optical channel and a second optical channel. The first channel carries information signals in a plurality of first time periods alternating with a plurality of second time periods having no information signals and the second channel carries information signals during said plurality of second time periods, and no information signals during said plurality of first time periods. Coupled to the switching means is a means for inserting identification signals during the no information signal time periods on the first and second channels.

In further accordance with the principles of the present invention, an apparatus for reproducing information signals recorded on an optical tape record medium is provided. This apparatus comprises first and second sources of radiant energy providing beams of coherent light. Further, means for guiding the optical tape record medium in an arc greater than 180° adjacent to a rotatable support is provided. Attached to the rotatable support are first and second means for focusing the coherent light beams to spots on the optical tape record medium. A means is provided for establishing relative motion between the rotatable support and the optical tape record medium such that the focused light spots of the coherent light beams scan the optical tape record medium in a helical fashion along the arc established by the guiding means. Additionally, attached to the rotatable support is a means for directing the light beam from the first source of radiant energy to the first focusing means during a first time interval during which the light beam from the first source helically scans the arc of the optical tape record medium and for directing the light beam from the second source of radiant energy to the second focusing means during a second time interval during which the light beam helically scans the arc of the optical tape record medium. Further, the apparatus comprises a first light detection means and a second light detection means. Each light detection means is responsive to the light beam reflected thereto from the optical tape and develops electrical signals representative of recorded information signals. The apparatus also includes means for adjusting the position of each focused spot and means for developing position error signals for operating the position adjusting means.

Figure 4:
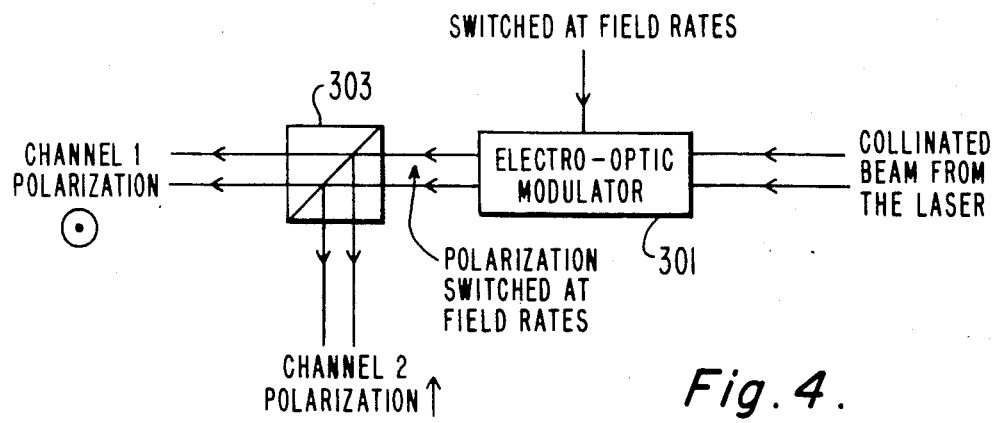
FIG. 4 shows an alternative embodiment of the field switching device of FIG. 1.
Figure 8:
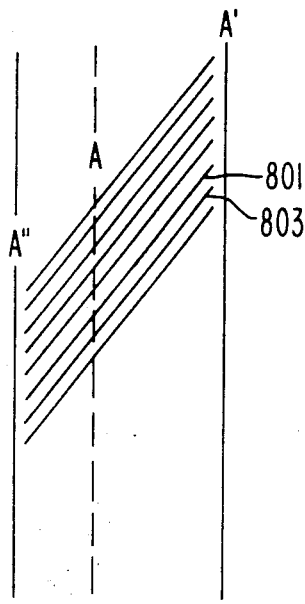
Figure 9:
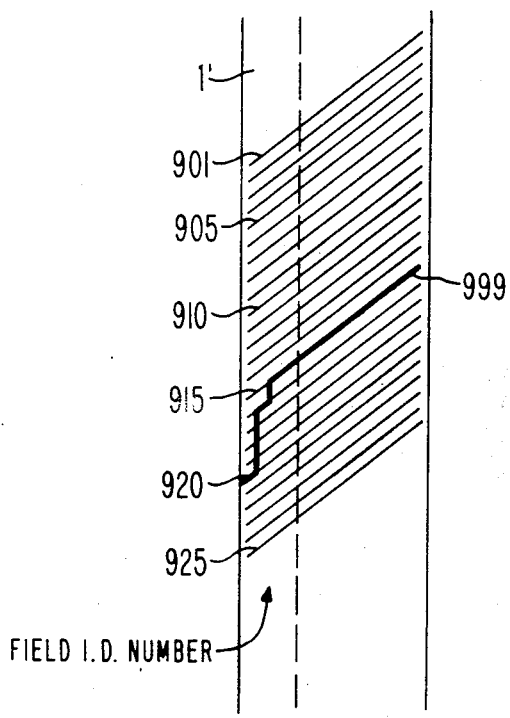
Figure 10:
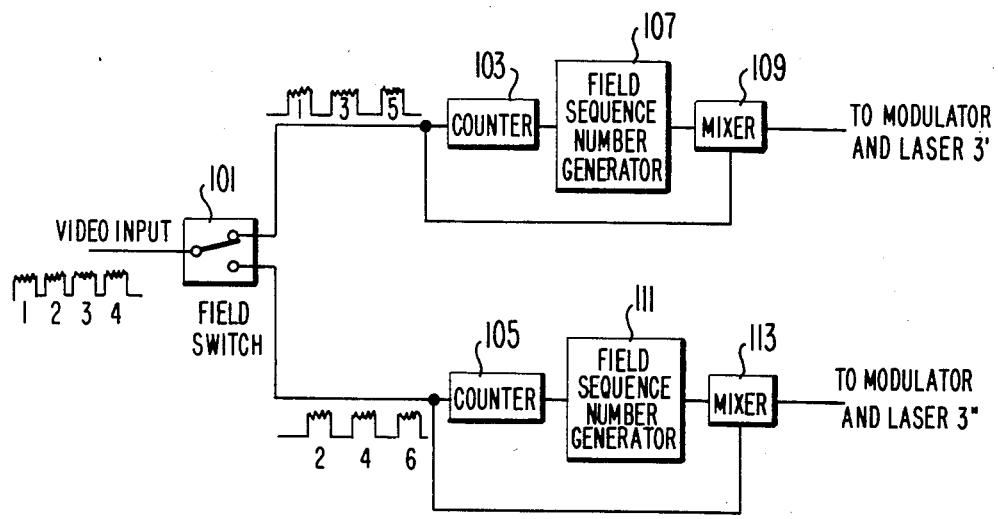
Figure 11:
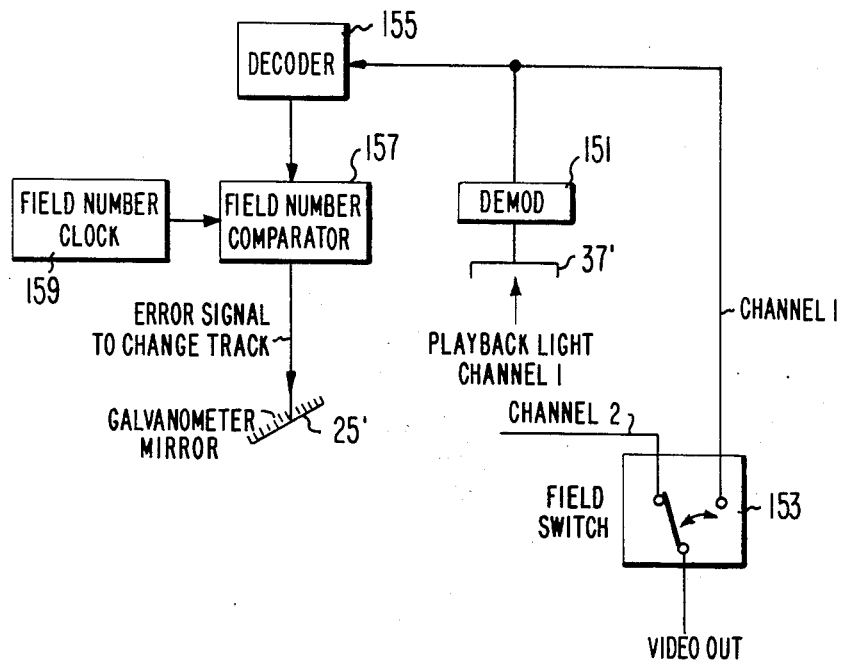

FIG. 7(a)-(e) illustrates schematically the information signal waveforms suitable for use with the present invention;

FIG. 8 is a plan view of a helical scan on a record medium having a helical information track separated into two sections used for field identification sequence information and field video information;

FIG. 9 illustrates a tracking scheme for a record medium encoded in accordance with one embodiment of the present invention;

FIG. 10 illustrates apparatus for use with the optical tape record and playback apparatus of FIG. 4 for recording field identification sequence numbers; and FIG. 11 illustrates, partially in block diagram form, apparatus for aligning the light beam on the proper track of the record medium during playback.

Figure 1:
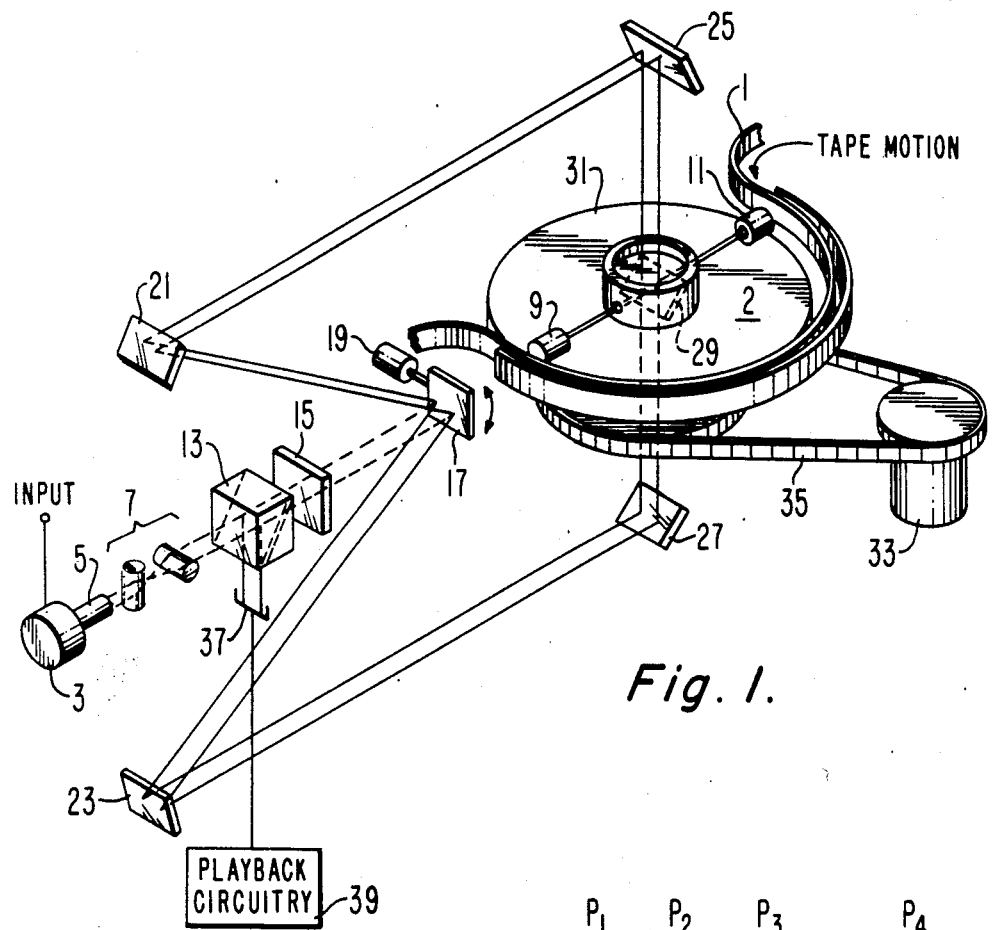
FIG. 1 is a perspective view of an optical tape record and playback apparatus in accordance with the present invention.

FIG. 1 illustrates a record/playback apparatus in accordance with the present invention. For an explanation of the operation of the illustrated apparatus, it should be assumed that recording medium or tape 1 which is moved from a supply reel (not shown) to a take-up reel (not shown) around a substantially 180° arc of recording station 2 is a plastic (e.g., polyester) backed tape having a coating structure which is highly absorptive in the recording mode.

Figure 2:
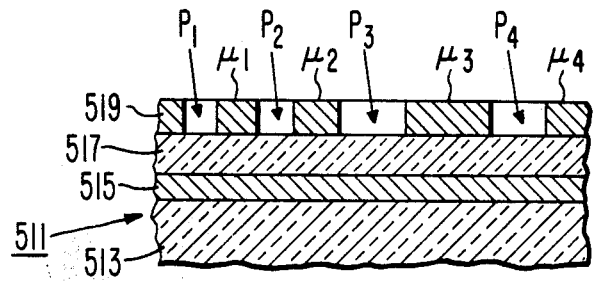
FIG. 2 is a cross-sectional view of a recording medium suitable for use in the optical tape record and playback apparatus of FIG. 1.

FIG. 2 illustrates a cross-sectional view of a record medium which can be used with the apparatus of FIG. 1. The record medium 511 includes a base material 513 (e.g., plastic) which is illustratively formed in the shape of a tape. Overlying the base material 513 is a thin layer 515 of a material exhibiting reasonably high reflectivity to light from laser 3 of FIG. 1 (e.g., a GaAs laser which emits a light beam having a wavelength of 8000 Å). Illustratively, reflective layer 515 may be in the form of a 600 Å thick layer of aluminum deposited by an evaporation process. Overlying the reflective layer 515 is a layer 517 of a material which is transparent to light from laser 3. Illustratively, layer 517 may be in the form of a 525 Å thick layer of silicon dioxide. A thin layer 519 of a material which is absorptive to light from laser 3 overlies the transparent layer 517. Illustratively, layer 519 may be in the form of 60 Å thick layer of tellurium. The layer thickness and materials of the record medium 511 are chosen such that record medium 511 exhibits a substantially anti-reflective effect when exposed with a light beam having a wavelength of 8000 Å. Such a structure provides a highly absorptive, highly sensitive recording medium.

As shown in the cross-section in FIG. 2, an information track is established in the absorptive coating 519. The information track comprises a succession of spaced pits ($p_1$, $p_2$, $p_3$, $p_4$) in which the absorptive layer 519 is removed, separated by regions ($u_1$, $u_2$, $u_3$, $u_4$) in which the absorptive layer 519 is undisturbed. During the recording process, record medium 511 is moved relative to the light beam emitted from laser 3 (the motion of record medium 511 will be described infra with respect to the operation of FIG. 1). During the occurrence of this relative motion, the intensity of the light beam is controlled in accordance with a recording information signal to form pits, such as $p_1$–$p_4$, which pits are representative of the information to be recorded.

The result of the above-described recording process is the formation of an information record having an information track which comprises undisturbed regions that exhibit reasonably low reflectance at the appropriate light frequency (due to the anti-reflective layer thickness choices described previously) alternating with pit regions, formed during the recording process by melting or ablating portions of layer 519, that exhibit high reflectivity at the appropriate light frequency. During information recovery a high readout contrast ratio is effected between the reflectance of the pits and the anti-reflectance of the intervening (undisturbed) regions.

Referring again to FIG. 1, laser 3 emits a non-circular coherent light beam into collecting objective 5. The collecting objective 5 captures substantially all of the emitted coherent radiation from laser 3 and images the non-circular beam onto the cylindrical beam expander 7. Beam expander 7 shapes the beam into a circular cross-section and expands the beam such that it substantially fills the aperture of focusing objectives 9, 11. From beam expander 7, the beam is transmitted through polarized beam splitter 13 and quarter-wave plate 15 to switching mirror 17. The operation of polarized beam splitter 13 and quarter-wave plate 15 will be explained in detail herein.

Galvanometer 19, attached to switching mirror 17, causes switching mirror 17 to seesaw back and forth such that the light beam reflected by switching mirror 17 alternately impinges on fixed mirrors 21 and 23. Mirrors 21 and 23 reflect the light beam to mirrors 25 and 27, respectively. From mirror 25 the light beam is directed to mirror 29 which reflects it so that it passes through objective 9 to impinge on record medium 1 while the light beam from mirror 27 is directed to mirror 29 which reflects it so that it passes through objective 11 to impinge on record medium 1. The light beam which enters objectives 9, 11 has been expanded by the optical elements 5, 7 such that the apertures of objectives 9, 11 are substantially filled. Objectives 9, 11 which have a high numerical aperture (i.e. on the order of 0.5) focus the light beam on the surface of record medium 1.

Objective lenses 9, 11 and mirror 29 are mounted on rotatable support 31. Rotatable support 31 is coupled to motor 33 by belt 35. During recording and playback operations, rotatable support 31 is driven by motor 33 and belt 35.

To maintain proper focus of the spot on record medium 1 objective lenses 9, 11 are each provided with a voice coil actuated type positioning mechanism (not shown). The voice coil mechanism in cooperation with suitable sensing means (e.g., capacitive type distance sensor) maintains the light beam in focus on the surface of the record medium 1. For an example of the operation of a voice coil actuated lens positioning means and capacitance sensing means, reference should be made to U.S. patent application Ser. No. 777,477, now U.S. Pat. No. 4,300,226, to W. E. Barnette et al. filed on Mar. 14, 1977.

The utilization of the apparatus of FIG. 1 for recording information will now be explained. Information signals which may be in the form of composite video signals with sound accompaniment are modulated and provided at laser 3 (illustratively, a color television signal of the NTSC format is frequency modulated over a deviation range of 7–10 MHz). The output light intensity of laser 3 is shifted between high and low levels in consonance with the modulated information signals. In the record mode, the high level intensity of laser 3 is sufficient to ablate, vaporize or evaporate the absorptive coating 519 of record medium 511 while the low level intensity is insufficient to effect removal of coating 519.

As described above, objective lenses 9, 11 and mirror 29 are mounted on rotatable support 31 which is driven by motor 33. Rotatable support 31 is positioned at a slight angle with respect to the axis formed by cutting through the center of mirrors 25 and 27.

Figure 3:
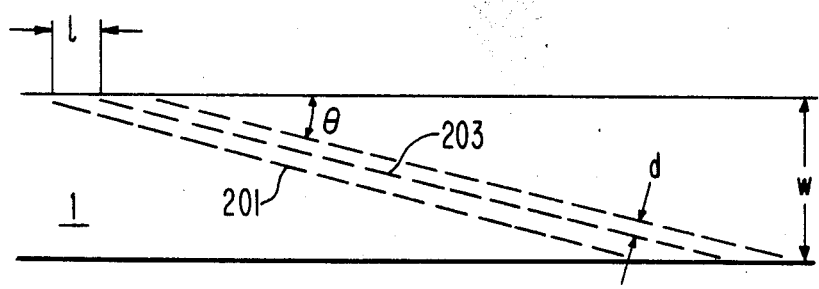
FIG. 3 is a plan view of the recording medium; illustrating helical scan lines.

Record medium 1 is driven by the take-up reel around the 180° arc of the recording station 2. The relative motion established between the light beam focused by objective lens 9 or 11 and record medium effects a helical scan of record medium 1 by the focused spot. This helical scan which results from the slightly angled orientation of support 31 relative to the mirror system forms a trace 201 across record medium 1 as shown in FIG. 3. Switching mirror 17 effects a scanning of successive trace lines 201, 203 across record medium 1 by alternately directing the light beam to objective lens 9 and objective lens 11 as each objective lens respectively scans the length of recording medium 1 traversing the 180° arc between lenses 9 and 11.

To effect non-segmented scanning of color television signals of the NTSC format, rotatable support 31 is rotated at 1800 RPM and mirror 17 is switched at the field rate. The length of the 180° arc or diameter of recording station 2 is determined by the video signal bandwidth, the duration of one field of video and the diameter of the record beam focused spot. Assuming an 8 MHz bandwidth, a field rate of 1/60 second and a spot size of $8 \times 10^{-5}$ cm., the diameter of recording station 2 would be about 14 cm. The tape speed is dependent upon the tape width, length of the 180° arc and the track-to-track spacing. Referring to FIG. 3, if the tape width w is 1 cm., length of the 180° arc is $(14 \cdot \pi)/2$ cm and the track-to-track spacing d is $2\mu$, then the tape velocity will be 0.26 cm/sec or 0.10 inches/second.

In the playback mode laser 3 is biased to emit a linearly polarized continuous light beam of an intensity insufficient to disturb the absorptive layer of record medium 1. The polarization of laser 3 is oriented such that the playback light beam passes through the polarized beam splitter 13 as it approaches quarter-wave plate 15. The laser beam follows the previously described path (via elements 15, 17, 21, 25, 29 or 15, 17, 23, 27, 29) to lens 9 or 11 which focuses the beam on the desired information track of record medium 1. Light reflected from the information track is returned via elements 29, 25, 21 or 29, 27, 23 to quarter-wave plate 15 and beam splitter 13. As the returned light has made two passes through quarter-wave plate 15 its polarization has been altered to a direction which results in reflection of the returned light by beam splitter 13 to photodetector 37.

The intensity of the light falling upon photodetector 37 alternates between a maximum level and a minimum level as the successive regions ($p_1$, $u_1$, $p_2$, $u_2$, etc.) of the information track pass through the path of the focused beam. The maximum intensity level for light reaching photodetector 37 is obtained when a pit ($p_1$, $p_2$, etc.) of the absorptive layer is in the focused beam path, while the minimum intensity level for light reaching photodetector 37 is obtained when an undisturbed region ($u_1$, $u_2$, etc.) is in the focused beam path.

The output of photodetector 37 comprises carrier waves with zero crossings recurring at frequencies varying in consonance with the pit edge spacing variations. The information signals previously recorded on the record medium are retrieved at the output of the playback circuitry 39. When a color television signal has been recorded on the record medium 1 the output of the playback circuitry may be applied to a color television receiver to view the recorded television signals.

An alternative arrangement for the field switching device is illustrated in FIG. 4. In the FIG. 4 embodiment, the laser beam from laser 3 is passed through an electro-optic modulator 301 which switches the polarization of the incident beam when a suitable signal is applied thereto. Polarized beam splitter 303 is arranged to intercept the light beam which passes through electro-optic modulator 301. The light beam incident on beam splitter 303 is directed in orthogonal directions (i.e., undeviated and deflected by 90°) at the switching rate. In operation, electro-optic modulator 301 is not activated for a field and thus the light beam passes through modulator 301 and splitter 303 undeflected. For a successive field the electro-optic modulator 301 is activated and causes rotation of the polarization of the light beam such that polarized beam splitter 303 deflects the light beam in a direction orthogonal to the original direction. In this manner, the light beam can be switched at the scanning rate to impinge on mirrors 25 and 27 alternatively.

Figure 5:
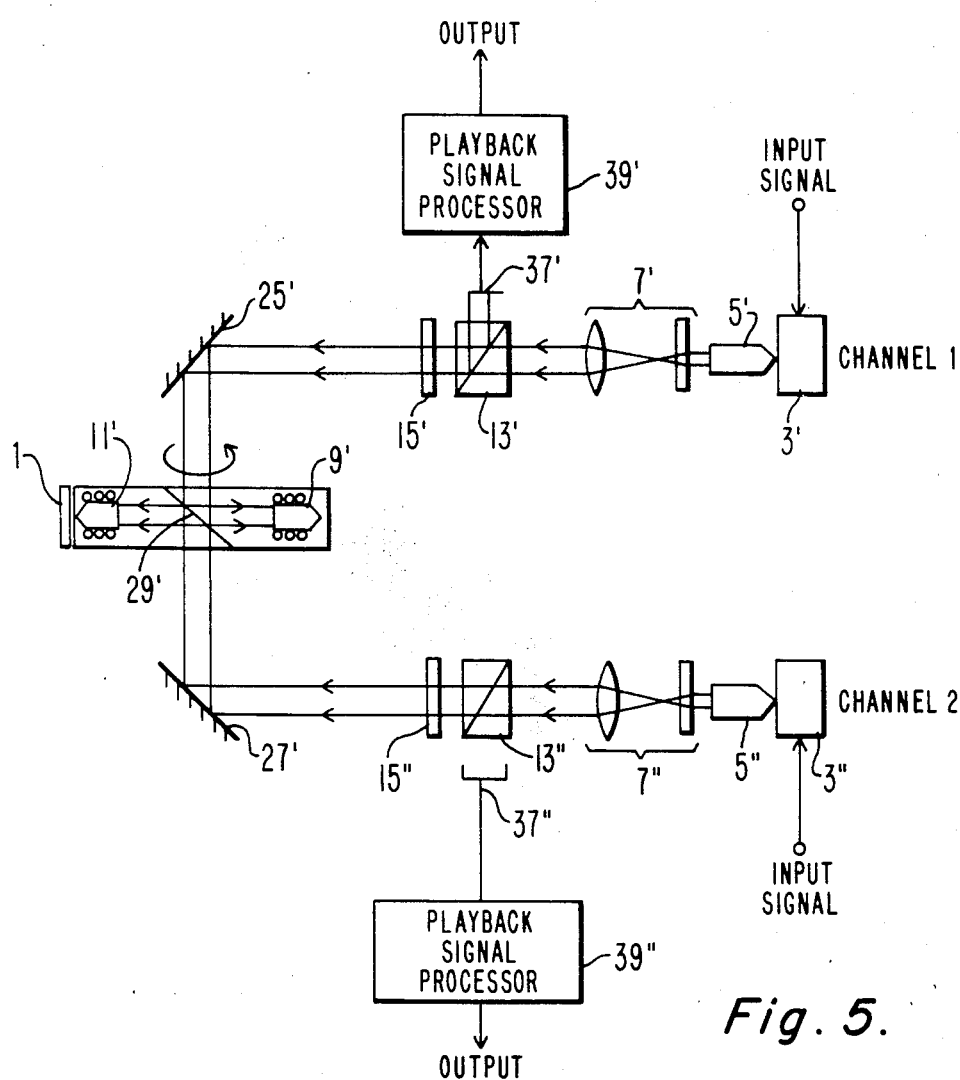
FIG. 5 is a plan view partially in block diagram form of an alternative embodiment of the optical tape record and playback apparatus of the present invention.

A third embodiment for switching the information signals to successive tracks on the record medium is illustrated in FIG. 5. In this arrangement lasers 3' and 3" are used. Laser 3' emits a light beam in accordance with the input signal applied thereto which follows the path via elements 5', 7', 13', 15', 25', 29' (corresponding to elements 5, 7, 13, 15, 25, 29 of FIG. 1) to lens 9' which focuses the light beam on the desired information track of record medium 1. Laser 3", on the other hand, emits a light beam which follows the path via elements 5", 7", 13", 15", 27', 29' to lens 11'. As shown in FIG. 5, this arrangement is implemented with two detectors 37' and 37" and two playback signal processors 39' and 39" which operate in the same manner as the detector and signal processor of FIG. 1.

The mode of operation of the drive mechanisms (i.e., the linear motion of the tape and the rotary motion of the objective lenses) is chosen to be appropriate for helically scanning the information track on the surface of the record medium. To effect fine control of the spot location mirrors 25 and 27 of FIG. 1 and mirrors 25' and 27' of FIG. 5 can be pivoted which during the operation thereof causes the scanning spot to be displaced in the desired fashion on the record medium surface. The mirrors 25 and 27 are pivoted to maintain the scanning spot centered on an average centralized position along the information track. The pivotal movement of mirrors 25, 27 may be controlled by galvanometers (not shown). The mirror galvanometer and control circuitry therefor may be of a type described in U.S. Pat. No. 4,138,741 to L. V. Hedlund et al. issued on Feb. 6, 1979.

One of the advantages of the optical tape format is its relatively high storage capacity. Successive scan lines may have a center-to-center spacing of approximately $2\mu$ which contributes to this high information packing density. Because of the high packing density and close spacing, there is always a possibility that the focused spot will not lock onto the correct track as rotatable support 31 of FIG. 1 rotates and tape 1 passes across the record head 2. When the information recorded on the record medium 1 is in the form of video signals where each scan line corresponds to one field, failure to lock onto the correct track will result in playback of the video signal with field information either missing or out-of-sequence.

Figure 6:
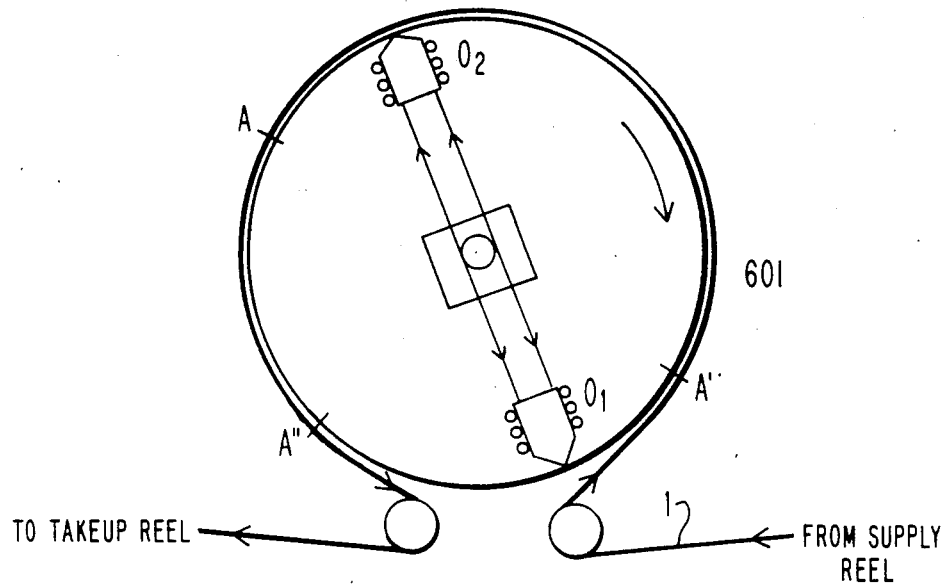
FIG. 6 is a plan view of an alternative embodiment of the optical tape recording head of FIG. 5.

Referring to FIG. 6, schematic of an alternative optical tape recording head 601 which should tend to alleviate the aforementioned lock-on problem is illustrated. When the information recorded on record medium 1 is in the form of video signals, that portion of the signal corresponding to each field is recorded as each rotating objective $O_1$, $O_2$ successively passes through the arc AA' (i.e., approximately 180°) and a field identification sequence is recorded in arc A"A. Field identification arc A"A and field information arc AA' in combination are greater than 180°. During recording, successive fields of video information are switched alternately between the lasers 3' and 3" of FIG. 5.

Figure 7:
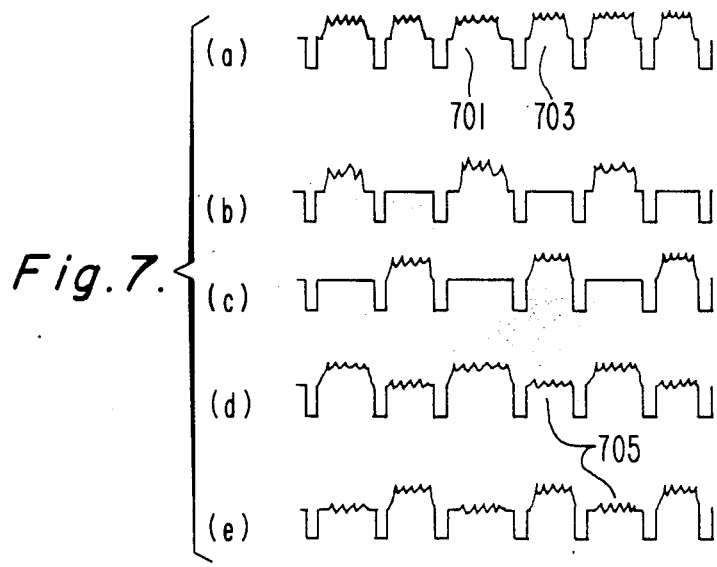

The recording of field sequence information is illustrated with reference to FIG. 7. Waveform (a) of FIG. 7 represents the input video signal illustrating successive fields 701, 703. Waveforms (b) and (c) illustrate the video input signal split between each laser channel, waveform (b) being applied to one laser and waveform (c) being applied to the other laser. Waveforms (d) and (e) represent waveforms (b) and (c) with the field identification sequence 705 added.

Referring to FIG. 8, information tracks 801 and 803 recorded in accordance with the apparatus of FIG. 6 are illustrated. Information tracks 801, 803 are separated into two sections: A"A of field identification sequence information and AA' of field video information.

An example of the lock-on technique is illustrated with reference to FIG. 9. Tracks 901 through 925 are recorded on the record medium 1. In this example, the next field video signal to be reproduced is recorded on track 915 and the focused spot initially locks onto track 920.

The location of the focused spot (i.e., track 920) is decoded by suitable decoding circuitry, compared to the desired track, and an error signal is transmitted to the galvanometer controlled mirror to deflect the mirror. After the focused spot locks onto the new track (in this example, track 916), that track is identified and an additional deflection is made if necessary. This identification, deflection process is continued until the focused spot locks onto the correct track. In the example shown in FIG. 9, the focused spot locks onto track 915 after two deflections. The time required to identify the track and deflect the spot is approximately 1 msec.; therefore, if the field identification sequence recorded along arc A"A is on the order of 5 msec. duration, 4 or 5 iterations are permitted before the field video signal readout must commence.

Referring to FIG. 10, apparatus is illustrated for recording signals corresponding to field identification sequence information. The video input signal is applied to the input terminal of field switch 101. Field switch 101 switches the video input at the field rate (e.g., 60 Hz) such that odd fields (e.g., 1, 3, 5, etc.) are transmitted to counter 103 and even fields (e.g., 2, 4, 6, etc.) are transmitted to counter 105.

The television signal comprises not only information of video aspects of the signal but also blanking interval signals and other signals usually included in a television signal. The start pulse for the field counter 103 may be based on the vertical sync pulse interval which occurs during the vertical blanking interval of a composite video signal such as an NTSC format signal. Counter 103 is coupled to a field sequence number generator 107. The field sequence number generator 107 is coupled to additive mixer 109. The output signals from additive mixer 109 are coupled via a modulation means to laser 3' of FIG. 5. Similarly, the even fields are coupled via field sequence number generator 111 and mixer 113 to laser 3" of FIG. 5.

The field sequence number generators 107 and 111 operate as follows. Field counters 103, 105 generate a pulse for every field. Generators 107, 111 receive a pulse representative of a field from counters 103, 105 respectively and generate signals corresponding to a field sequence number that is to be inserted for identification of the detected field. The signals representing field sequence numbers are coupled to mixer 109 or 113 wherein the field sequence number signal is inserted onto the signal format. See also FIG. 7 and specification supra.

Refer now to FIG. 11 for an arrangement of a suitable playback apparatus which utilizes the field sequence number to align or position the focused spot on the appropriate helical track. The apparatus of FIG. 11 will be explained with reference to the apparatus of FIG. 5 and the field sequence number inserted by the apparatus of FIG. 10. The apparatus of FIG. 11 will be described with reference to only one channel; it should be understood that a similar device would be utilized for the other channel.

The readout light beam incident on the tape is reflected back via objective 9', mirror 29', mirror 25' and beam splitter 13' to detector 37', as shown in FIG. 5. Detector 37' is connected via demodulator 151 to output field switch 153 and decoder 155, as shown in FIG. 11. Decoder 155 is connected to field number comparator 157 which provides an error signal to galvanometer controlled mirror 25'. A field number clock 159 is also connected to field number comparator 157.

The apparatus of FIG. 11 operates as follows. The demodulated signal is transmitted to decoder 155 which extracts the field sequence number therefrom. Simultaneously, field number clock 159 provides an indication of the field number to be read by laser 3'. Field number comparator 157 compares the field sequence number from decoder 155 to the field number from field number clock 159. Comparator 157 provides an error signal which represents the difference between the field numbers from decoder 155 and from clock 159. The error signal from comparator 159 takes the form of a control voltage whose magnitude and sense represents the number of tracks and direction respectively that the focused spot must be moved. The error signal which is coupled to the galvanometer causes mirror 25' to move about a pivot point such that the read beam moves closer to or locks onto the correct track.

A repetitive series of the field sequence number is provided with each field to ensure rapid identification of the field sequence number during the iterative search procedure for the next field required. After the focused spot has been repositioned, decoder 155 extracts a new field sequence number which is compared to the field number generated in clock 159 in comparator 157. If the two numbers are not identical, a new error signal is transmitted to galvanometer mirror 25' to move the focused spot. As described above, after a few iterations the focused spot should be locked onto the correct track.

While the principles of the present invention have been demonstrated with particular regard to the illustrative structures of FIGS. 1-11, it will be recognized that various departures from such illustrative structures may be undertaken in practice of the invention. For example, the diode lasers may be replaced with more conventional gas lasers and electro-optical modulators.

Further, it may be advantageous for archival purposes to overcoat the record medium structure to protect it from environmental effects. Overcoat structures for the record medium may be of a type described in U.S. Pat. No. 4,101,907 to A. E. Bell et al., issued on July 19, 1978.

I claim:

1. In an optical tape recorder for recording information signals onto an optical tape record medium; said recorder, comprising: first and second sources of radiant energy; each of said sources providing a beam of coherent light; a rotatable support; means for guiding said optical tape record medium in an arc greater than 180° adjacent to said rotatable support; first and second means, attached to said rotatable support, for focusing said coherent light beams from said first and second sources respectively to spots on said optical tape record medium; means for establishing relative motion between said rotatable support and said optical tape record medium such that each of said focused light spots of said coherent light beams scan said optical tape record medium in a helical fashion along the arc established by said guiding means; first means for modulating said coherent light beam from said first source in accordance with said information signals during a first time interval during which said light beam from said first focusing means helically scans said arc of said optical tape record medium; second means for modulating said coherent light beams from said second source in accordance with said information signals during a second time interval during which said light beam from said second focusing means helically scans said arc of said optical tape record medium; means, attached to said rotatable support, for directing said light beam from said first source of radiant energy to said first focusing means during said first time interval and for directing said light beam from said second source of radiant energy to said second focusing means during said second time interval, an apparatus comprising:

a first channel coupling a source of said information signals to said first modulating means;

a second channel coupling said source of information signals to said second modulating means;

means for switching said information signals between said first and second channels such that said first channel carries information signals during a plurality of first time periods alternating with a plurality of second time periods having no information signals and said second channel carries information signals during said plurality of second time periods alternating with no information signals during said plurality of first time periods;

means, for inserting identification signals in said first channel during said plurality of second time periods; and for inserting identification signals in said second channel during said plurality of first time periods.

2. An apparatus in accordance with claim 1 wherein said information signals comprise a full television frame of two fields of composite color video signals with accompanying audio signals.

3. An apparatus in accordance with claim 2 wherein said switching means switches at the field rate such that said first channel includes odd fields and said second channel includes even fields.

4. In an optical tape playback apparatus for reproducing information signals recorded on an optical tape record medium, said playback apparatus, comprising: first and second sources of radiant energy, each of said sources providing a beam of coherent light; a rotatable support; means for guiding said optical tape record medium in an arc greater than 180° adjacent to said rotatable support; first and second means, attached to said rotatable support, for focusing said coherent light beams from said first and second source respectively to spots on said optical tape record medium; means for establishing relative motion between said rotatable support and said optical tape record medium such that said focused light spots of said coherent light beams scan said optical tape record medium in a helical fashion along the arc established by said guiding means; means, attached to said rotatable support, for directing said light beam from said first source of radiant energy to said first focusing means during a first time interval during which said light beam from said first source helically scans said arc of said optical tape record medium and for directing said light beam from said second source of radiant energy to said second focusing means during a second time interval during which said light beam from said second source helically scans said arc of said optical tape record medium; first light detection means, responsive to said light beam from said first source reflected from said optical tape record medium during said first time interval, for developing electrical signals representative of said recorded information signals; and second light detection means, responsive to said light beam from said second source reflected from said optical tape record medium during said second time interval, for developing electrical signals representative of said recorded information signals, an apparatus; comprising:

means, interposed between said first source of radiant energy and said directing means, for adjusting the position of said first focused spot on said optical tape record medium; and means, coupled to said first light detection means, for developing an error signal representative of the current position of said first focused spot on said optical tape record medium; said error signal being applied to said adjusting means to position said first focused spot to a desired location on said optical tape record medium.

5. An apparatus in accordance with claim 4 further comprising:

additional adjusting means, interposed between said second source of radiant energy and said directing means, for adjusting the position of said second focused spot on said optical tape record medium; and additional error signal developing means, coupled to said second light detection means, for developing an additional error signal representative of the current position of said second focused spot on said optical tape record medium; said additional error signal being applied to said additional adjusting means to position said second focused spot to a desired location on said optical tape record medium.

6. An apparatus in accordance with claim 4 wherein said recorded information signals include identification signals, and wherein said means for developing an error signal includes:

means, coupled to said first light detection means, for decoding said identification signals;

means for providing an indication of the desired position of said focused spot on said optical tape record medium; and comparator means responsive to said decoding means and said indication providing means for providing said error signal.

* * * * *